P. R. SHILL.
PNEUMATIC DESPATCH SYSTEM.
APPLICATION FILED AUG. 14, 1908.

939,872.

Patented Nov. 9, 1909.
8 SHEETS—SHEET 5.

UNITED STATES PATENT OFFICE.

PERCY RICHARDSON SHILL, OF LEYTONSTONE, ENGLAND, ASSIGNOR OF ONE-FOURTH TO CHARLES WILLIAM BLUEMEL, ONE-FOURTH TO FRANK HENRY BLUEMEL, AND ONE-FOURTH TO ERNEST ADOLPHUS BLUEMEL, WOLSTON, ENGLAND.

PNEUMATIC-DESPATCH SYSTEM.

939,872.  Specification of Letters Patent.  Patented Nov. 9, 1909.

Application filed August 14, 1908. Serial No. 448,631.

*To all whom it may concern:*

Be it known that I, PERCY RICHARDSON SHILL, a subject of the King of Great Britain, residing at Leytonstone, Essex, England, have invented a certain new and useful Pneumatic-Despatch System, of which the following is a specification.

This invention relates to electrically-controlled pneumatic despatch-tubes, cash railways and the like, of the kind described in the specification of British Letters Patent No. 16650 of 1904, that is to say to systems in which there is a single tube forming a closed air circuit, and the said invention has for its chief object to simplify the construction of such systems whereby carriers of the same form can be used for all the sub-stations, and the need for electrical contacts on the carriers is dispensed with.

The said invention comprises improved forms of transmitting and receiving apparatus for use at the central and sub-stations, improvements relating to the switches used for switching the carriers into the sub-stations, and an improved arrangement of a single tube air circuit to form two or more systems, all substantially as hereinafter described with reference to the accompanying drawings.

In these drawings: Fig. 2ª is a similar view to Fig. 2, showing the operative parts in the position which they assume when a carrier is leaving the sending terminal. Fig. 3 is a transverse vertical section on the line A B, Fig. 1, looking toward the left of said figure. Fig. 4 is a transverse vertical section on the line A B, Fig. 1, looking toward the right of said figure. Figs. 3ª and 4ª are respectively views similar to Figs. 3 and 4, showing the operative parts in the position which they assume when a carrier is lying in the sending terminal ready for despatching. Fig. 4ᵇ is a perspective view showing the arrangement of the contact plunger and its carriage in relation to the switch-contacts and detent-bar. Fig. 5 shows on a smaller scale the general arrangement of the inlet or sending terminal and outlet or delivery terminal, and the connections with the blower at the central station. (Figs. 7 to 13 are drawn to a scale larger than that of Fig. 6). Fig. 9 is a vertical section of an outlet or delivery terminal for a carrier either at the central station or at a sub-station. Fig. 10 is a horizontal section on the line E F, Fig. 9, showing details of the outlet or delivery terminal. Fig. 11 is a side elevation, partly in section illustrating an inlet or sending terminal for the carriers at one of the sub-stations. Fig. 11ª is a similar view to Fig. 11, showing the parts in the position which they assume when a carrier is leaving the sending terminal. Fig. 12 is a vertical section on the line J K, Fig. 11, and Fig. 13 is a horizontal section on the line L M, Fig. 11, showing details of the inlet or sending terminal.

Like characters indicate corresponding parts throughout the drawings.

Figure 15:
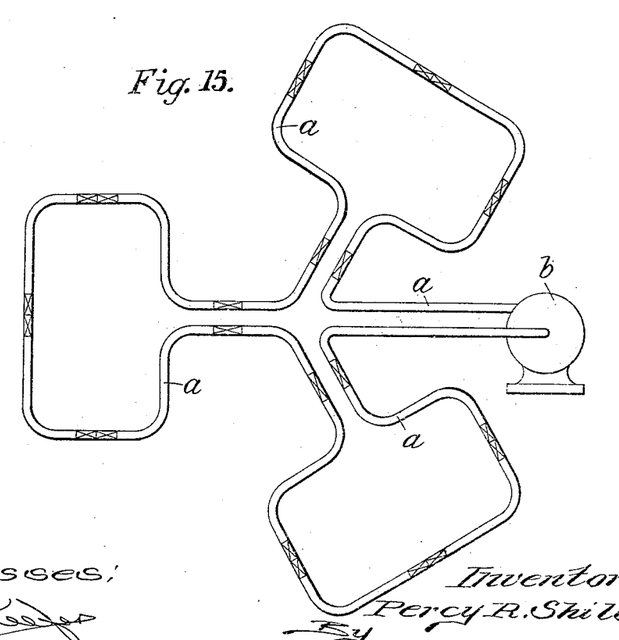
Fig. 15 is a diagram showing the arrangement of a single main pneumatic tube or conduit and blower controlling three systems each comprising a central station and a series of sub-stations.

*a* is a single pneumatic tube, which is arranged in a continuous circuit extending from the inlet to the outlet of a blower *b*, substantially as described in the specification of said former Letters Patent No. 16650 of 1904, or as shown in Fig. 15.

Figure 2:
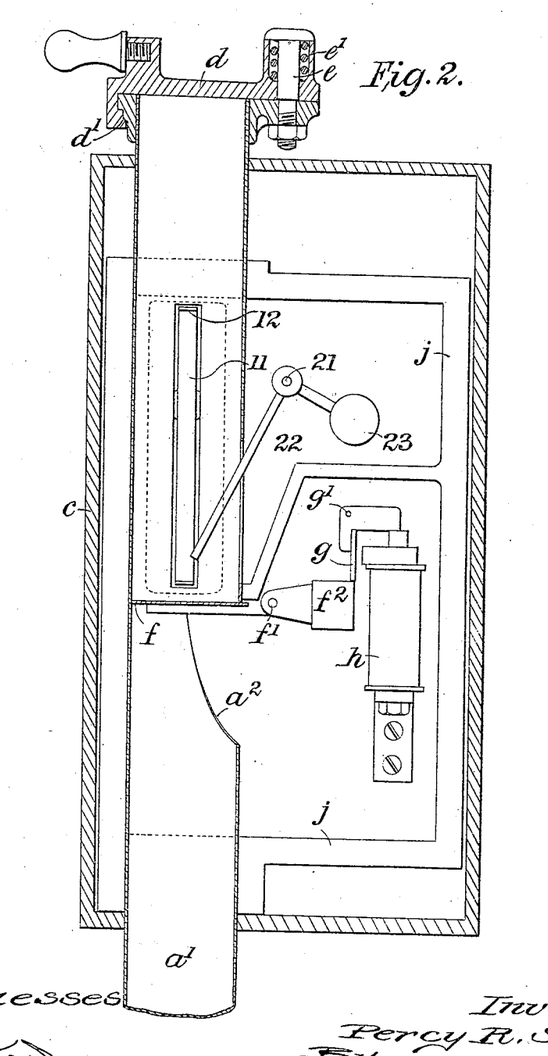
Fig. 2 is a rear elevation partly in vertical section, of the said sending terminal.
Figures 9, 10, 11, 11A, 12, 13:
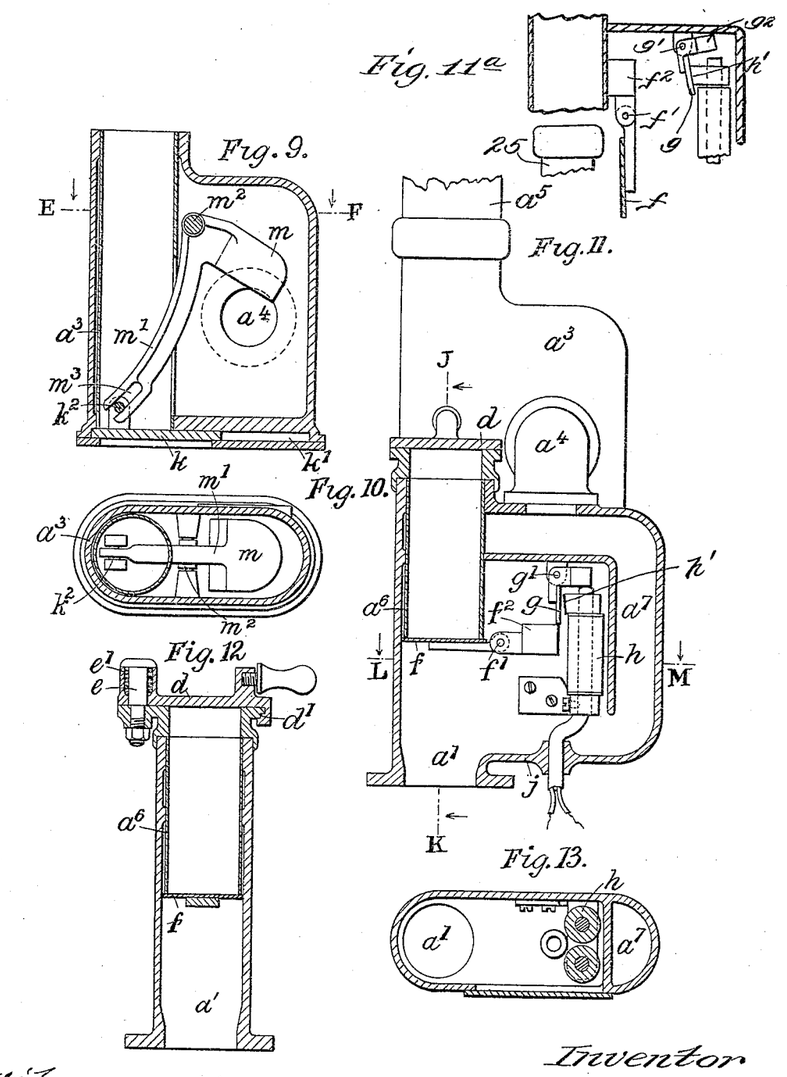

Each station, whether central or sub-station, comprises an inlet and an outlet for the carriers. I will now proceed to describe the inlet or sending terminal at the central station with reference to Figs. 2 and 5. The inlet or sending terminal comprises a box or casing *c* through which extends a branch pneumatic tube *a'*. In order to permit the insertion of the carriers, the tube *a'* is provided at its upper end with a door *d*, turning about a pivot-pin *e*. Said door is drawn down on to its seat by a spring *e'* arranged around the pin *e* and by cam surfaces *d'*, *d'* formed on the said door and on the upper end of the tube *a'*. At a suitable distance below said upper end, greater than the length of a carrier, there is provided a trap-door $f$, which extends into the tube $a'$ through a lateral aperture $a^2$ and turns about a horizontal axis $f'$. This door when there is no carrier in the upper end of the tube $a'$ is brought into its raised position by means of a counterweight $f^2$. A detent $g$, pivoted at $g'$ and provided with a counterbalance-weight $g^2$ of non-magnetic material is provided for locking the door $f$ in its raised position, so as to enable it to support a loaded carrier. This detent forms the armature of an electromagnet $h$, having pole-pieces $h'$ whereby it can be tripped, so as to release the trap-door $f$ and allow the carrier to overbalance the weight $f^2$ and fall down the lower part of the branch tube $a'$, into the main air tube $a$, where it is acted upon by the air current produced by the blower $b$. A closed casing $j$ surrounds the part of the tube $a'$ which is perforated to receive the door $f$ and the levers hereinafter described. The sending terminals of the several sub-stations are, as can be seen from Figs. 11, 12 and 13 constructed with substantially the same parts. In these, however, a liner tube $a^6$ is provided, between the lower end of which and the entrance to the branch pipe $a'$ is a gap.

Figures 4, 4A, 5:
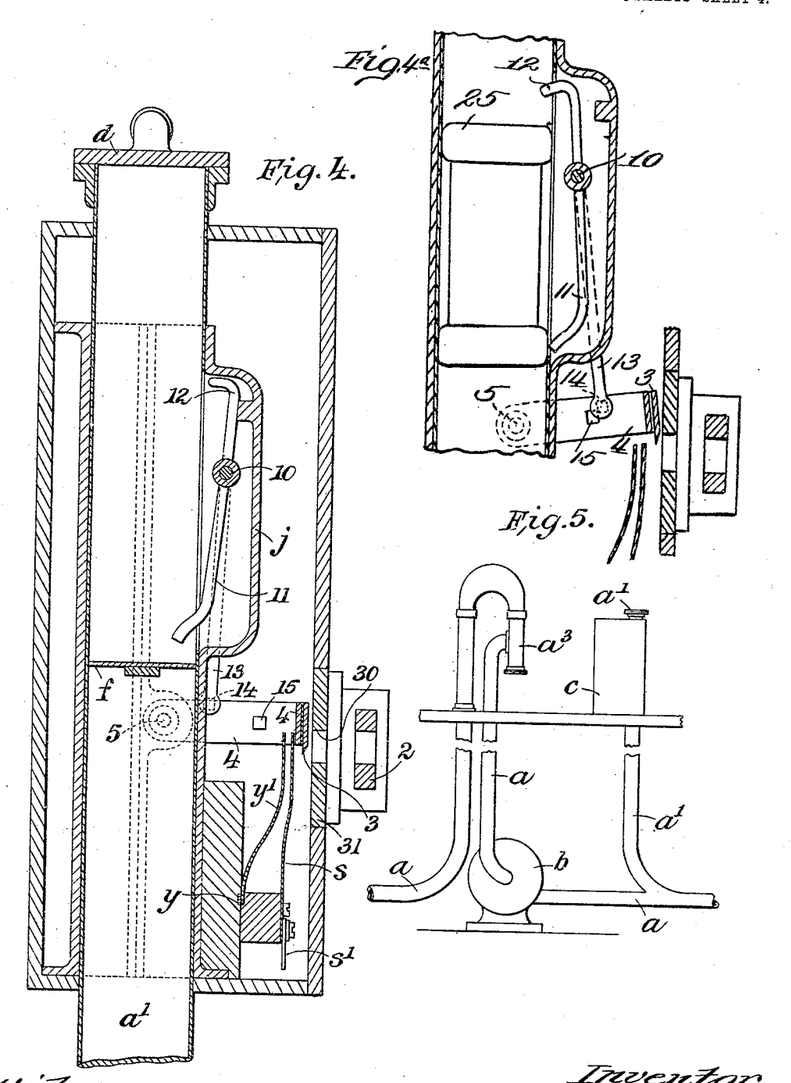
Figure 4B:
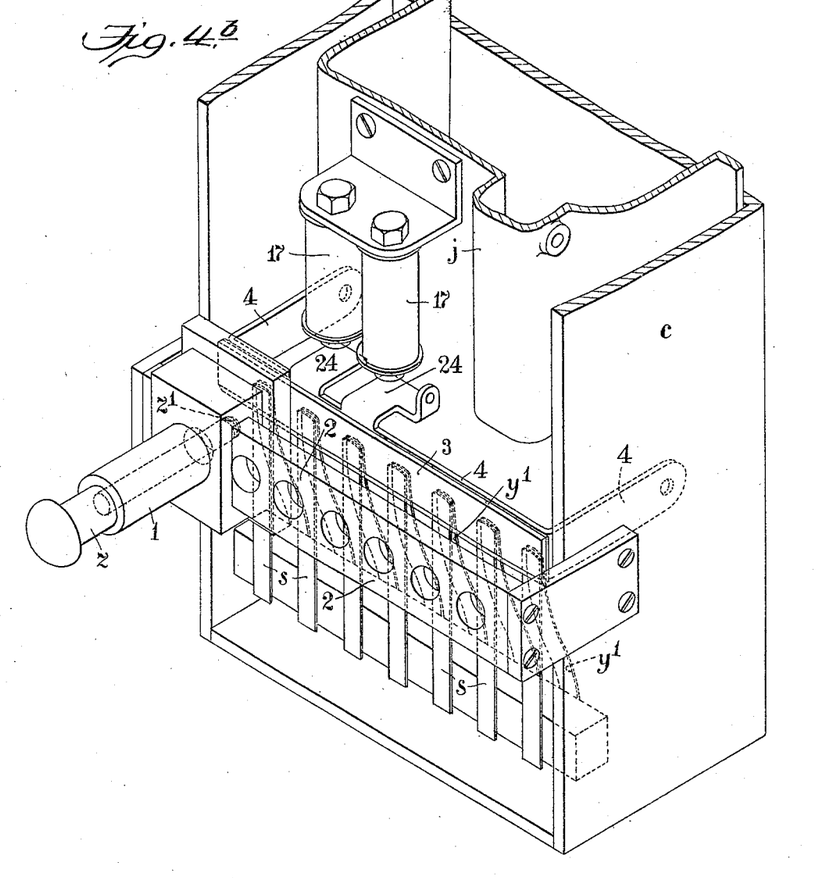

The outlet or delivery terminal at the central station is in series with the tube $a$ as shown in Fig. 5, those at the sub-stations are arranged in branch tubes $a^5$. The construction of the delivery terminal or outlet is the same for all stations and comprises a casting $a^3$, Figs. 9 and 10, the carrier outlet from which is furnished with a door $k$ moving transversely in guides $k'$ and normally retained in its closed position by means of a bent lever $m$, $m'$ pivoted at $m^2$. The arm $m$ of this lever is made in the form of a counterweight, while the arm $m'$ is connected at its lower end to the door $k$ by means of a slot $m^3$ engaging a pin $k^2$ on the door $k$. The arm $m'$ is moreover curved on its upper surface, so as to enable it to engage smoothly with the leading end of a carrier and to be swung laterally thereby, so as to open the door $k$ and allow the carrier to pass out. When the carrier is clear of the arm $m'$ and door $k$, the said door is immediately closed by the weighted arm $m$. The air passes from the casting $a^3$ through an opening at the side thereof to the blower $b$ in the case of the central station delivery terminal, and to the adjoining sending terminal in the case of a sub-station. The connection between the sending and delivery terminals at a sub-station is through a branch pipe $a^4$. And preferably the air is carried around a channel $a^7$ in the sending terminal so as to avoid fouling the electromagnet $h$ and connected parts.

Figures 6, 8:
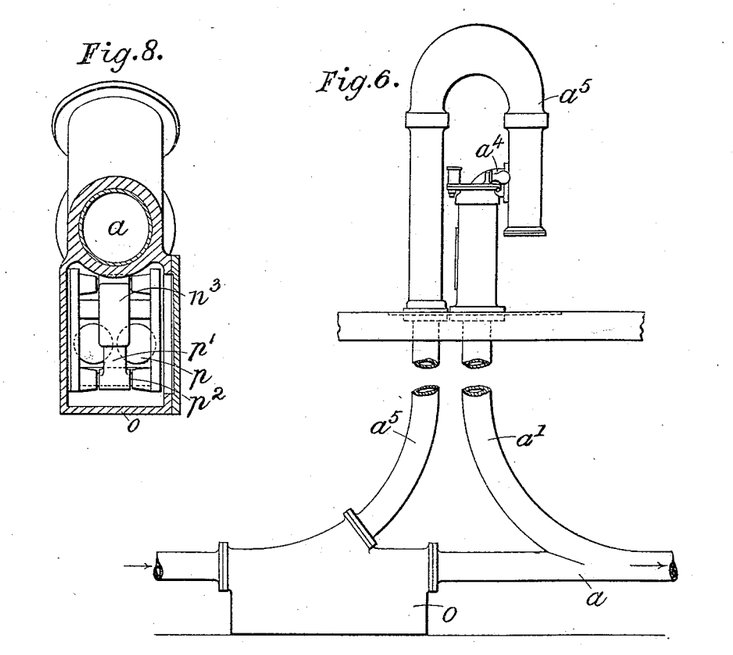
Fig. 6 is a front elevation, drawn to a smaller scale, showing the general arrangement at a sub-station.
Fig. 8 a vertical transverse section on the line C D, Fig. 7, showing an electromagnetically-operated switch for diverting carriers from the main pneumatic tube into a sub-station.
Figure 7:
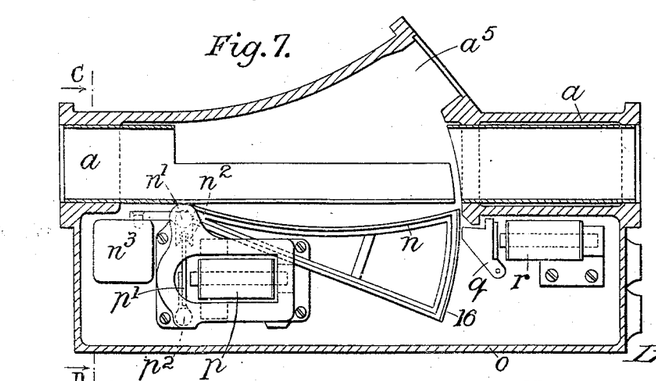
Fig. 7 is a vertical longitudinal section.

The branch air-pipe $a^5$ leading from the main air-pipe $a$ to a sub-station is controlled by a switch $n$, Figs. 6, 7 and 8, which is actuated electromagnetically from the central station as hereinafter described when it is desired to divert a carrier from the main tube $a$ into the branch tube $a^5$ of the particular sub-station in question. The switch $n$ is pivotally mounted at $n'$ in a closed casing $o$. The said switch is normally retained out of the path of the carriers in the main tube by the action of gravity and is raised to divert a carrier into the branch-tube $a^5$ by means of an electromagnet $p$ having an armature $p'$ pivotally mounted at $p^2$ and engaging at its free end in a fork $n^2$ on the switch $n$. A weighted arm $n^3$ on the switch $n$ partly counterbalances the said switch, so as to reduce the work to be done by the electromagnet $p$. The switch $n$ is retained in its raised position by means of a gravity-pawl $q$ engaging with the free end of said switch, so as to render it unnecessary for the current to circulate through the coils of the electromagnet $p$ for the whole time that the said switch is to be maintained in its raised position. The pawl $q$ is combined with the armature of an electromagnet $r$ whereby it may be tripped from the central station as hereinafter described. The switch $n$ is moreover provided at its free end with an arc-shaped plate or valve 16 which closes the thoroughfare of the main air pipe $a$ beyond the switch $n$ when said switch is raised and thus causes the air-current to be diverted into the branch passage or by-pass $a^5$, $a^3$, $a^4$, $a'$ from which it returns to the main tube $a$ at the farther side of the sub-station.

Figure 1:
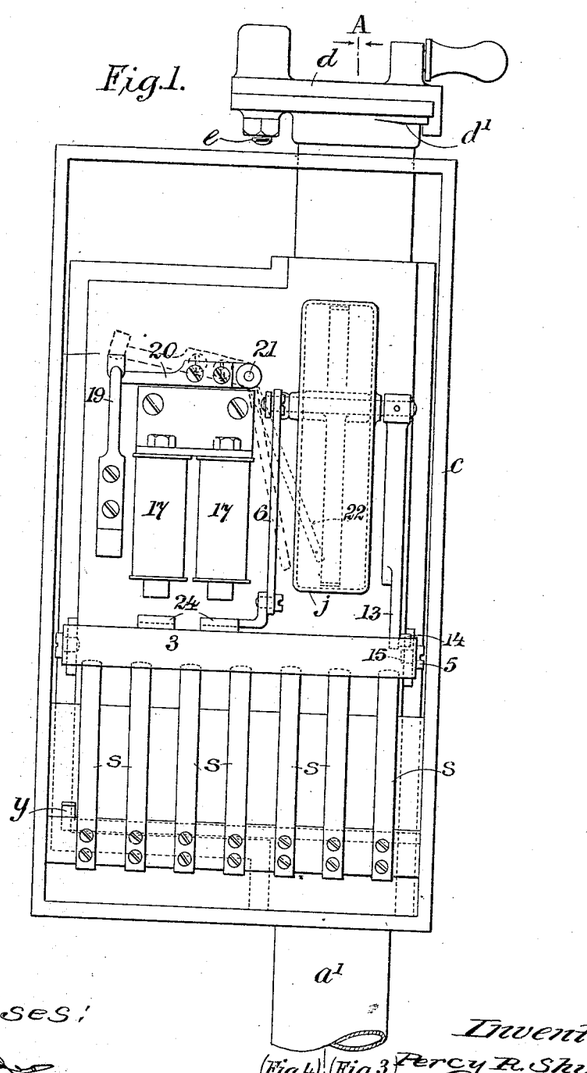
—Figure 1 is a front elevation with the cover removed showing the inlet or sending terminal at the central station.
Figures 2A, 3, 3A:
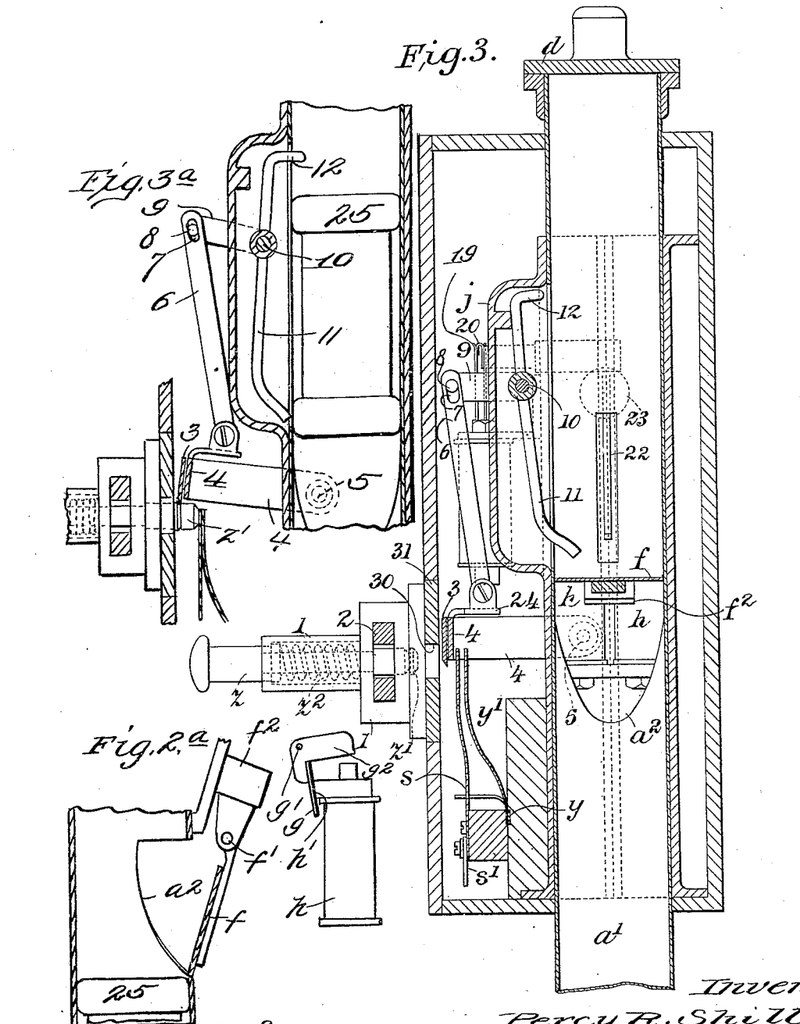

The selection of the particular sub-station to which a carrier is to be sent from the central station is effected by means of the following electrical system:—A multiple-way selector switch comprising a number of insulated contact-springs $s$, $s$ (Figs. 1, 3 and 4) each connected by a line-conductor $s'$ (Fig. 14) to one of the switch-electromagnets $p$, the several circuits being completed through a common return $t$, a suitable electric generator $u$, a conductor $v$, a time switch having an uniformly rotating contact-piece $w$ and stationary contacts $w'$, $w'$, the releasing electro-magnet $h$ for the trap-door $f$ at the central station, a conductor $x$ and a bus bar $y$ bearing a number of contact-springs $y'$, $y'$ respectively arranged opposite the contact-springs $s$, $s$. Any pair of springs $s$, $y'$ can be brought into contact with each other by means of a plunger $z$ which can be pushed inward to press the springs $s$, $y'$ together. Opposite each pair of springs $s$, $y'$ is an opening 30 in a front cover plate 31 through which the plunger $z$ passes and by which the plunger is caused to register with the springs $s$, $y'$. The plunger $z$ is mounted in a carriage 1 sliding transversely on a longitudinally slotted guide-bar 2 and is provided with an undercut-head $z'$. This plunger is normally returned to its outermost position by a spring $z^2$, but when there is a carrier in the part of the tube $a'$ above the trap-door $f$, the plunger $z$ is retained in its innermost position by means of an insulated detent bar 3 which is mounted on a bail 4 pivoted at 5 to the casing $j$. This bail is connected by a pivoted link 6 and a slot 7 and pin 8 to an arm 9 fixed to an arbor 10 rotatably mounted in the casing $j$. The said bail in its normal position stands directly in front of the end of the plunger $z$ (Fig. 3), so as to prevent the said plunger from being pressed in. The arbor 10 has fixed thereto a lever 11, which is arranged inside the casing $j$ and the lower end of which normally extends through a slot into the tube $a'$, as shown in Fig. 3, so as to be pressed outward by a carrier introduced into the upper end of the tube $a'$ and at the same time to move a stop 12 fixed on the upper arm or end of the lever 11 into the thoroughfare of the tube $a'$ above the carrier, thereby preventing the introduction of further carriers into said tube. The arbor 10 also has fixed thereto, outside the casing $j$, an arm 13 bearing a projection 14 which, when the lever 11 has been oscillated by a carrier inserted into the tube $a'$ as above described, moves over and in front of a similar projection 15 on the bail 4, the said bail only being lifted by the link 6 to such a height as to permit the passage of the projection 14 over the projection 15. If the head $z'$ of the plunger $z$ be now pressed beneath the detent-bar 3 so as to further raise the bail 4, the projection 15 will be brought into the path of the projection 14 thereby preventing the return of the lever 11 until the bail 4 has been raised as hereinafter described and the plunger $z$ released and thus allowed to return to its normal position.

For raising the bail 4, an electromagnet 17 is provided, which is connected to the electric generator $u$ through the conductor $t$, and through the contacts $w^2$, $w^2$ of the timing switch, (Fig. 14) the conductor 18 and a switch 19, 20, the movable arm 20 of which is fixed on an arbor 21 pivotally mounted in the casing $j$. The arbor 21 bears a weighted arm 23, which normally holds the switch arm 20 in such a position that the circuit is closed, and a second arm 22, which is arranged inside said casing and extends into the path of the carrier in the upper end of the tube $a'$. When a carrier is brought into position on the trap-door $f$, the arm 22 is moved so as to separate the switch-contacts 19, 20. When, however, the carrier has moved past the trap-door $f$, and the arm 22 has been released, the arbor 21 will be turned by the weighted arm 23 so as to close the switch 19, 20, so that when the movable contact $w$ of the timing switch connects the contacts $w^2$, $w^2$, the electromagnet 17 will lift the bail 4 and detent bar 3 by means of armature pieces 24, 24 thereon and thus allow the plunger $z$ to be drawn out by its spring $z^2$; as the bail 4 is immediately released by the electromagnet 17 by reason of the contact $w$ leaving the fixed contacts $w^2$, $w^2$, the projection 14 will be free to move past the projection 15 and allow the lever 11 to return to its normal position, thus withdrawing the stop 12 from the thoroughfare of the tube $a'$ and thereby permitting the insertion of another carrier. The releasing electromagnets $h$, $h$ for the sub-station inlet apparatus and also the releasing electromagnets $r$, $r$ for the switches $n$, $n$ are connected across the conductors $t$, 18, so that these electromagnets are simultaneously energized when the contact $w$ of the timing switch passes over the fixed contacts $w^2$, $w^2$.

The operation of the improved system is as follows: Assuming carriers 25 to be resting on the trap-doors $f$, $f$ in the sending terminals at the central station and at one or more of the sub-stations, and the plunger $z$ at the central station to be arranged opposite the desired pair of springs $s$, $y'$, and to be pressed in (Figs. 3$^a$ and 4$^a$) so that the switch $n$ at the corresponding sub-station will be raised by its electromagnet $p$, then as soon as the contact $w$ of the timing switch moves past the fixed contacts $w'$, $w'$, the inlet releasing magnet $h$ at the central station will be energized and will release the carrier (Fig. 2$^a$) and allow it to pass down the pipe $a'$ to the main tube $a$ and thence to the desired sub-station where the switch $n$ is raised. Here the carrier will deflect the lever $m'$ and valve $k$ of the delivery terminal and pass out into a suitable receptacle. On the movable contact $w$ reaching the fixed contacts $w^2$, $w^2$, the releasing electromagnets $h$, $h$ of the inlet doors $f$, $f$ at the sub-stations (Fig. 11$^a$) and also the releasing electromagnets $r$, $r$ of the switches $n$, $n$ will be energized, so that the carriers in the sending terminals at the sub-stations will be admitted into the main tube $a$ and any switch $n$, which may be raised will simultaneously be lowered to clear the passage through the main tube $a$ and thus allow all the carriers to pass along the tube $a$ and out at the delivery terminal at the central station. Thus there is no interference between the carriers traveling from and to the central station.

Figure 14:
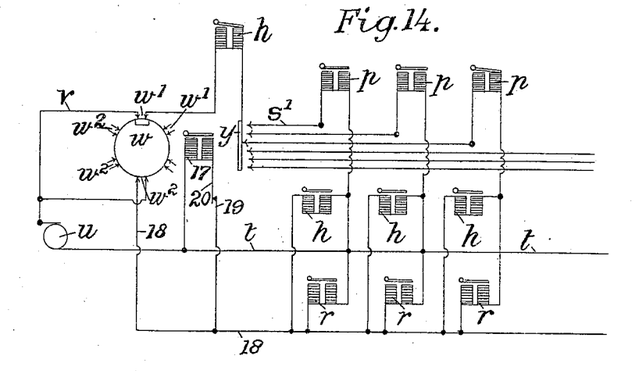
Fig. 14 is a diagram showing the arrangement of the electric circuits.

In Fig. 15, an arrangement is shown in which three systems with their central sending and delivery terminals are arranged in series on a common main tube $a$. In this case, the several releasing electromagnets of the several systems are operated successively, for which purpose the contacts $w'$, $w'$, $w^2$, $w^2$ thereof are preferably arranged at regular intervals around the movable member of the timing switch, as indicated in Fig. 14ª. If desired two systems or four or more systems may be controlled from a single blower and timing switch.

What I claim is:—

1. An electrically-controlled pneumatic despatch tube, cash railway or the like, comprising an air-tube, an air-propelling device connected to said air-tube, a multiple-way electric selector-switch, an electric generator, electromagnetically-controlled carrier-switch-apparatus at the several stations, electrical connections between said carrier-switch apparatus, said electric generator and said selector-switch, a plunger, for actuating the contacts of said multiple-way selector-switch, a detent-bar for holding said plunger in its pressed-in position, an electromagnet for disengaging said detent-bar from said plunger, a releasing switch for connecting and disconnecting said disengaging electromagnet to and from said electric generator, electric connections between said electric generator, said electromagnet and said releasing switch and means controlled by a carrier in a sending terminal of said air-tube for opening and closing said releasing switch.

2. An electrically-controlled pneumatic despatch-tube, cash railway or the like, comprising an air-tube closed on itself, substations branching from said air-tube, an air-propelling device connected in the circuit of said air-tube, carriers adapted to move in said air-tube, carrier-switches serving as air-valves and adapted to deflect said carriers into the substations, electromagnets for moving said carrier-switches into their operative positions, a manually-operated multiple-way electric selector-switch, an electric generator, electric connections between said electric generator, said electromagnets and said selector-switch, sending terminals comprising means for retaining the carriers, electromagnets for releasing said carrier-retaining means, electromagnets for releasing said carrier-switches and an electric time-switch for periodically closing interruptions in the circuits of said electro-magnets.

3. In an electrically-controlled pneumatic despatch-tube, cash railway or the like, a multiple-way electric selector-switch and central-station carrier-despatching apparatus comprising a series of spring contact-pieces, a plunger adjustable laterally to register with any one of said contact-pieces, a spring urging said plunger away from said contact-pieces, a detent-bar adapted to hold said plunger in engagement with any one of said contact-pieces, an electromagnet for disengaging said detent-bar from said plunger, an electric generator, an air-tube, and means for closing the circuit of said electromagnet when there is no carrier in the sending terminal of said air-tube and for opening said electric circuit when a carrier is in said sending terminal.

4. In an electrically-controlled pneumatic despatch-tube, cash railway or the like, a multiple-way electric selector-switch and central-station carrier-despatching apparatus, comprising a series of spring contact-pieces, a plunger adjustable laterally to register with any one of said contact-pieces, a spring urging said plunger away from said contact-pieces, a detent-bar adapted to hold said plunger in engagement with any one of said contact-pieces, an electromagnet for disengaging said detent-bar from said plunger, an electric generator, an air-tube, a switch controlling the circuit of said electromagnet, and a weighted operating lever for said switch, said lever extending into the sending terminal of said air-tube in such a manner as to open the switch when there is a carrier in said sending terminal and to close said switch when said carrier has been despatched.

5. In an electrically-controlled pneumatic despatch-tube, cash railway or the like, a multiple-way electric selector-switch and central-station carrier-despatching apparatus, comprising a series of spring contact-pieces, a plunger adjustable laterally to register with any one of said contact-pieces, a spring urging said plunger away from said contact-pieces, a detent-bar adapted to hold said plunger in engagement with any one of said contact-pieces, an electromagnet for disengaging said detent-bar from said plunger, an electric generator, an air-tube, means for closing the circuit of said electromagnet when there is no carrier in the sending terminal of said air-tube and for opening said electric circuit when a carrier is in said inlet end, a pivoted lever, a link pivotally connecting said lever and said detent-bar through a pin and slot connection, and an arm fixed to said lever and extending into the sending terminal of said air-tube so as to cause the detent-bar to be supported directly in the path of said plunger when there is no carrier in said sending terminal and to be supported in position for retaining said plunger in its pushed-in position when a carrier is in said sending terminal.

6. In an electrically-controlled pneumatic despatch-tube, cash railway or the like, a multiple-way electric selector-switch and central-station carrier-despatching apparatus comprising a series of spring contact-pieces, a plunger adjustable laterally to register with any one of said contact-pieces, a spring urging said plunger away from said contact-pieces, a detent-bar adapted to hold said plunger in engagement with any one of said contact-pieces, an electromagnet for disengaging said detent-bar from said plunger, an electric generator, an air-tube, means for closing the circuit of said electromagnet when there is no carrier in the sending terminal of said air-tube and for opening said electric circuit when a carrier is in said sending terminal, a pivoted lever, a link pivotally connecting said lever and said detent-bar through a pin and slot connection, a stop fixed to an upper arm of said lever and extending into the sending terminal of said air-tube so as to cause the detent-bar to be supported directly in the path of said plunger when there is no carrier in said sending terminal and to be supported in position for retaining said plunger in its pushed-in position when a carrier is in said sending terminal, and an arm forming an extension of said pivoted lever, said stop, when there is a carrier in said sending terminal, projecting into said sending terminal on the outer side of said carrier so as to prevent the insertion of another carrier until the one already in said sending terminal has been despatched.

7. In an electrically-controlled pneumatic despatch-tube, cash railway or the like, a sending terminal comprising a series of spring contact-pieces, a plunger adjustable laterally to register with any one of said contact-pieces, a spring urging said plunger away from said contact-pieces, a detent-bar adapted to hold said plunger in engagement with any one of said contact-pieces, an electromagnet for disengaging said detent-bar from said plunger, an electric generator, an air-tube, means for closing the circuit of said electromagnet when there is no carrier in the sending terminal of said air-tube and for opening said electric circuit when a carrier is in said sending terminal, a pivoted lever, a link pivotally connecting said lever and said detent-bar through a pin and slot connection, an arm fixed to said lever and extending into the sending terminal of said air-tube so as to cause the detent-bar to be supported directly in the path of said plunger when there is no carrier in said sending terminal and to be supported in position for retaining said plunger in its pushed-in position when a carrier is in said sending terminal, a stop-arm fixed to said pivoted lever, a stop on said detent-bar for coacting with said stop-arm when a carrier is in the sending terminal of the air-tube and the plunger has been pushed in, so as to prevent the return of said pivoted lever, detent-lever and plunger to their normal positions until the detent-bar has been attracted by its controlling electromagnet.

8. In an electrically-controlled pneumatic despatch-tube, cash railway or the like, an air-tube closed on itself, an air-tube, a sub-station arranged as a loop on the main air-tube, a switch for diverting carriers from the main air-tube into said loop, automatic means for retaining said switch in its inoperative position, an electromagnet for bringing said switch into its operative position, an electromagnet for tripping said detent, an electric generator, and an electric timing switch for successively and momentarily connecting said carrier-switch electromagnet and said detent-electromagnet with said electric generator, a predetermined interval of time being allowed to elapse between said connections.

9. A single-tube air-conduit closed on itself and arranged to form a plurality of electrically-controlled pneumatic despatch-tube, cash-railway or like systems, central and sub-stations for each of said systems, an electric generator, electromagnetically-controlled sending terminals for said stations, electromagnetically controlled carrier-switch setting and releasing devices for the sub-stations, an electromagnetically-controlled electric selector-switch arranged at each central station, and an electric timing switch which momentarily connects said electric generator simultaneously with the sending terminal for the central station of each system and the setting device for a carrier-switch and after a predetermined time momentarily connects said electric generator simultaneously with the sending terminals for the substations and the releasing devices for the carrier-switches of the same system, the corresponding connections for the different systems being separated by predetermined intervals of time.

10. An electrically-controlled pneumatic despatch tube, cash railway or the like, comprising an air-tube forming a closed air-circuit, an air propelling device connected in said air-circuit, substations in the form of by-passes or loops on said air-circuit, electrically-actuated carrier-deflecting-switches at said substations, a multiple-way electric selector-switch, detents or pawls for said carrier-deflecting switches, electric tripping devices for said detents or pawls, electrically-actuated sending terminals or carrier-inlets, an electric generator, means for locking said selector-switch, an electrically-actuated release for said selector-switch, electric connections between said electric generator and said electrically-actuated mechanism and a timing-switch controlling interruptions in said electric connections.

11. A multiple-way electric selector-switch for an electrically controlled pneumatic despatch tube, cash railway or the like, comprising a series of electric contacts, a plunger adjustable to register with any one of said contacts, a spring urging said plunger away from said contacts, a detent-bar for holding said plunger in engagement with any one of said contacts, an electromagnet for disengaging said detent-bar from said plunger, an electric switch for controlling the circuit of said electromagnet, an air-tube, a weighted operating lever for said switch, said lever normally extending into the sending terminal or inlet end of said air tube and closing said switch, a pivoted arm normally extending into the sending terminal or inlet end of said air-tube, a lever fixed to said arm, a link pivotally connecting said lever and said detent-bar through a pin and slot connection, a stop-arm fixed to said lever, a stop on said detent-bar for coacting with said stop-arm, and a carrier-stop forming an extension of the said arm in the sending terminal or inlet of said air-tube, substantially as and for the purposes hereinbefore described.

12. A multiple-way electric selector-switch for an electrically-controlled pneumatic despatch-tube, cash railway or the like, said switch comprising a series of movable electric contacts, a guide-frame, a carriage movable along said guide-frame, a spring-pressed plunger slidably mounted in said carriage, means for bringing said plunger into register with any one of said contacts, a detent-bar extending parallel to said guide-frame and adapted to engage a notch in said plunger when said plunger is in engagement with a contact, and an electromagnet for tripping said detent.

13. A multiple-way electric selector-switch for an electrically-controlled pneumatic despatch tube, cash railway or the like, said switch comprising a series of electric contacts, a spring-pressed plunger adjustable to register with any one of said contacts, a detent-bar for holding said plunger in its pressed-in position, electromagnetic means for releasing said plunger, and an electric timing switch for controlling said releasing means.

In testimony whereof I have hereunto set my hand in presence of two subscribing witnesses.

PERCY RICHARDSON SHILL.

Witnesses:
GEORGE HARRISON,
ALEXANDER W. ALLEN.